United States Patent
Wojtalik et al.

(10) Patent No.: US 11,643,132 B2
(45) Date of Patent: May 9, 2023

(54) STEERING COLUMN ASSEMBLY

(71) Applicant: ZF Steering Systems Poland Sp. z.o.o., Czechowice-Dziedzice (PL)

(72) Inventors: Artur Wojtalik, Katowice (PL); Pawel Ponikiewski, Pewel Mala (PL); Dawid Klimek, Zywiec (PL); Lukasz Dudzic, Tychy (PL)

(73) Assignee: ZF Steering Systems Poland Sp. Z.o.o.

(*) Notice: Subject to any disclaimer, the term of this patent is extended or adjusted under 35 U.S.C. 154(b) by 188 days.

(21) Appl. No.: 17/037,779

(22) Filed: Sep. 30, 2020

(65) Prior Publication Data

US 2021/0094606 A1 Apr. 1, 2021

(30) Foreign Application Priority Data

Sep. 30, 2019 (EP) .................................... 19461586

(51) Int. Cl.
*B62D 1/19* (2006.01)
*B21D 28/26* (2006.01)

(52) U.S. Cl.
CPC ............. *B62D 1/195* (2013.01); *B21D 28/26* (2013.01)

(58) Field of Classification Search
CPC ........ B62D 1/195; B21D 28/26; B21D 17/00; B21D 53/88
See application file for complete search history.

(56) References Cited

U.S. PATENT DOCUMENTS

| | | | |
|---|---|---|---|
| 5,738,377 A | 4/1998 | Sugiki et al. | |
| 6,394,241 B1* | 5/2002 | Desjardins | F16F 7/12 |
| | | | 280/805 |
| 8,827,311 B2* | 9/2014 | Schnitzer | B62D 1/184 |
| | | | 188/371 |
| 9,399,481 B2* | 7/2016 | Oehri | B62D 1/184 |
| 10,232,201 B2* | 3/2019 | Wells | A62B 35/0068 |
| 2009/0194366 A1 | 8/2009 | Parker et al. | |
| 2020/0198685 A1* | 6/2020 | Anspaugh | B62D 1/19 |

FOREIGN PATENT DOCUMENTS

| | | | | |
|---|---|---|---|---|
| CN | 201169287 Y | * | 12/2008 | |
| CN | 202481129 U | | 10/2012 | |
| CN | 106697036 A | | 5/2017 | |
| CN | 112407028 A | * | 2/2021 | |
| DE | 102015219086 B3 | * | 3/2017 | ............ B62D 1/187 |
| JP | 3514812 B2 | * | 3/2004 | |
| JP | 2008006933 A | * | 1/2008 | |
| JP | 2008037224 A | | 2/2008 | |
| KR | 1020080095473 A | | 10/2008 | |
| WO | WO-2011070348 A1 | * | 6/2011 | ............ B62D 1/184 |

* cited by examiner

*Primary Examiner* — Drew J Brown
(74) *Attorney, Agent, or Firm* — Robert James Harwood (57) ABSTRACT

A method for optimising an energy-absorbing strap includes the steps of: (1) producing a single metal sheet, including a first connecting portion, for connecting to one of a support bracket and a fixed part of a vehicle, and a second connecting portion, for connecting to the other of the support bracket and the fixed part of the vehicle; and (2) producing a weakening in the single metal sheet to separate the first connecting portion from a tearable portion; bending a portion of the single metal sheet to produce a bent portion that interconnects the second connecting portion and the tearable portion, the second portion being bent back around in relation to the tearable portion; wherein the steps are selected to produce a desired energy-absorbance profile.

22 Claims, 6 Drawing Sheets

STEERING COLUMN ASSEMBLY

CROSS-REFERENCE TO RELATED APPLICATION

This application claims priority to EP Patent Application No. 19461586.0 filed Sep. 30, 2019, the disclosure of which is incorporated herein by reference in its entirety.

TECHNICAL FIELD

The present disclosure relates to steering column assemblies that permit a steering wheel to collapse in a controlled manner in the event of a crash by controlled breakaway of a portion of the steering column assembly from a mounting bracket that secures it to the main body of the vehicle. More particularly, the disclosure relates to a support bracket assembly for fixing a shroud of a steering column assembly to a vehicle. The disclosure also relates to a method for optimising an energy-absorbing strap.

BACKGROUND

It is known to provide a steering column assembly comprising a shroud that houses a steering shaft. The steering shaft connects a steering wheel to the road wheels of the vehicle allowing the driver to rotate the steering wheel in turn to move the road wheels. The connection may be through a rack and pinion gearbox, and, to assist the driver, a hydraulic or electric assistance may be provided. In the case of electric assistance, a motor will act upon the steering shaft or a part of the steering between the shaft and the road wheels to apply a torque in the same sense as that applied by the driver.

The shroud may be non-adjustable in a simple arrangement in which it is fixed directly to a support bracket that is secured to the vehicle body, for instance to a beam that extends across the vehicle behind the dashboard. In other cases, it may be adjustable for rake or reach or both rake and reach. This may be achieved by connecting the shroud to a support bracket though an adjustable clamp mechanism, the support bracket in turn being fixed to the mounting bracket. During adjustment, the clamp assembly is released and the shroud can be moved up or down, or along, the support bracket.

To improve safety, it is known for the shroud to be telescopic so that in the event of a crash where the driver is thrown onto the steering wheel it can collapse and allow the wheel to move with the driver. This requires the shroud to be normally fixed to the vehicle body so it cannot move during normal use but able to break away and move in the event such a crash occurs. To achieve this, it is known to secure the shroud, or the support bracket fixed to the shroud, to the mounting bracket using one or more breakaway capsule assemblies. These are designed to provide a rigid connection during normal use but to breakaway when a predetermined load is applied to them, Once broken, the shroud can move relative to the mounting bracket. An energy absorbing mechanism may be provided to absorb the energy associated with the movement so that one broken the movement is controlled.

SUMMARY

According to a first aspect, there is provided a method for optimising an energy-absorbing strap, comprising the steps of:

producing a single metal sheet, including a first connecting portion, for connecting to one of a support bracket and a fixed part of a vehicle, and a second connecting portion, for connecting to the other of the support bracket and the fixed part of the vehicle;

producing a weakening in the single metal sheet to separate the first connecting portion from a tearable portion;

bending a portion of the single metal sheet to produce a bent portion that interconnects the second connecting portion and the tearable portion, the second portion being bent back around in relation to the tearable portion;

wherein the steps are selected to produce a desired energy-absorbance profile.

The method therefore enables the manufacture of an energy-absorbing strap that is optimised for a desired behaviour. This allows designers and manufacturers to adapt a single design of energy-absorbing strap for use in many different vehicles or for different expected impact forces, e.g. taking into account mass of a driver or expected speed of a collision.

The bent portion may be produced with a constant radius.

The bent portion may have a radius that is the same as a natural radius of the bent portion. By "natural radius", it is meant that the radius may match the radius that is naturally formed during deformation of the energy-absorbing strap. When the radius of the bent portion matches the natural radius, it has been found that the force to deform the energy-absorbing strap is constant or substantially constant, maintaining a constant energy-absorbance profile.

The bent portion may have a radius that is different to a natural radius of the bent portion. By "natural radius", it is meant that the radius may match the radius that is naturally formed during deformation of the energy-absorbing strap. When the radius of the bent portion differs from the natural radius, it has been found that the initial force to deform the energy-absorbing strap is higher or lower than that required to deform the energy absorbing strap when it has the natural radius. However, during collapse, the bent portion will eventually adapt such that it has the natural radius, at which point the force to deform the energy-absorbing strap will become constant. By having a radius that differs from the natural radius, an energy-absorbance profile that changes during a crash stroke can be obtained.

The bent portion may be produced with a variable radius. The variable radius may increase with distance from the tearable portion. The bent portion may be U-shaped or substantially U-shaped. The bent portion may be elliptic or rounded elliptic. The bent portion may be V-shaped or substantially V-shaped.

The step of producing the weakening may include forming a groove between the tearable portion and the first connecting portion. The depth and length of the groove may be selected to help to create the desired energy-absorbance profile. A depth of the groove may vary along a length of the groove. The step of producing the weakening may include forming a perforation between the tearable portion and the first connecting portion. The length, depth, frequency, and/or any other characteristics of the perforation may be selected to help to create the desired energy-absorbance profile. The weakening may include a combination of a groove, a perforation, or any other form of weakening.

The method may further comprise the step of selecting a grain direction of the single metal sheet in order to influence the energy-absorbance profile. Changing the grain direction can have a significant impact on the forces required to deform the energy-absorbing strap. The grain direction may be selected to be aligned or substantially aligned with a tearing direction of the tearable portion. By "tearing direction" it is meant the direction along which the energy-absorbing strap is deformed. The grain direction may be selected to be perpendicular or substantially perpendicular to a tearing direction of the tearable portion. It has been found that aligning the grains with the tearing direction leads to a lower force for the same displacement when compared with an energy-absorbing strap that has grains that are not aligned with the tearing direction. Aligning the grains perpendicularly to the tearing direction results in the highest force being required, all other things being equal.

The method may further include a step of twisting the second connecting portion to form a twist. The presence of a twist may enhance the connection to the support bracket. The twist may be configured to align with the support bracket. By including a twist, the connecting portion may be perfectly aligned for connection with whatever angle of support bracket it may be attached. It may additionally or alternatively ensure that proper access is provided for a connecting fastener such as a crew or rivet to be attached. A further advantage of the twist is that it may stiffen the strap in order to reduce the risk of an issue that may affect noise, vibration, or harshness (NVH).

According to a second aspect, there is provided a support bracket assembly for fixing a shroud of a steering column assembly to a vehicle, the support bracket assembly comprising: a support bracket configured to be fixable to the shroud; and an energy-absorbing strap for interconnecting the support bracket with a fixed part of the vehicle; wherein the energy-absorbing strap is formed from a single metal sheet and comprises: a first connecting portion configured to connect to one of the support bracket and the fixed part of the vehicle; a tearable portion extending along a part of one edge of the body, the tearable portion being connected to the first connecting portion of the body by a weakening; a second connecting portion configured to connect to the other of the support bracket and the fixed part of the vehicle; and a bent portion interconnecting the second connecting portion and the tearable portion, the second portion being bent back around in relation to the tearable portion. A support bracket as provided by the second aspect is able to be tuned to have an energy-absorbance profile desired by a manufacturer, and can therefore be adapted for many uses.

The bent portion may have a constant radius. The bent portion may have a radius that is the same as a natural radius of the bent portion. The bent portion may have a radius that is different to a natural radius of the bent portion. The bent portion may have a variable radius. The variable radius may increase with distance from the tearable portion. The bent portion may be U-shaped or substantially U-shaped. The bent portion may be elliptic or rounded elliptic. The bent portion may be V-shaped or substantially V-shaped. The weakening may be formed as a groove between the tearable portion and the first connecting portion.

A grain direction of the single metal sheet may be selected in order to influence the energy-absorbance profile. The grain direction may be selected to be aligned or substantially aligned with a tearing direction of the tearable portion. The grain direction may be selected to be perpendicular or substantially perpendicular to a tearing direction of the tearable portion. The second connecting portion may include a twist. The twist may be configured to align with the support bracket.

BRIEF DESCRIPTION OF THE DRAWINGS

Specific embodiments will now be described with reference to the accompanying drawings, in which.

DETAILED DESCRIPTION

Figure 1:
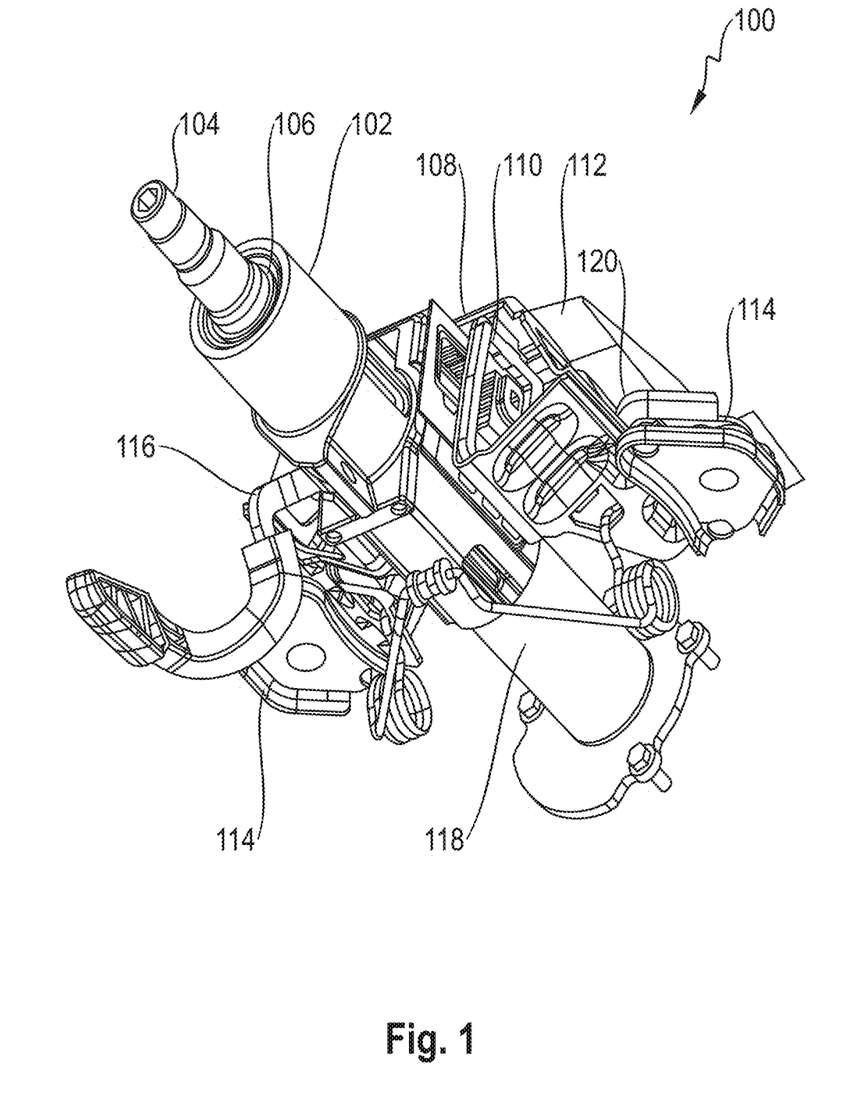
FIG. 1 is a perspective view of a steering column assembly including the support bracket assembly of the first aspect.

Referring firstly to FIG. 1, there is shown a steering column assembly 100 comprising a shroud 102 that houses a shaft 104. The shaft 104 is configured to be attached to a steering wheel (not shown). The shaft 104 is supported by a bearing assembly 106 that allows rotation of the shaft 104 relative to the shroud 102. A support bracket 108 includes two arms 110 that depend in a substantially vertical direction and provide support and stability to the shroud 102. A mounting bracket 112 is connected to the support bracket 108 by capsule assemblies 114 situated at each side of the support bracket 108. For clarity, the mounting bracket 112 is only shown in FIG. 1. A clamping assembly 116 is configured to allow movement of the shroud 102 relative to the support bracket 108 in an unclamped condition and to prevent movement of the shroud 102 relative to the support bracket 108 in the clamped condition. Clamping assemblies 116 are well-known in the art and therefore further description of the same is omitted, for brevity.

The shroud 102 of the present embodiment is telescopically arranged with a lower shroud 118 such that the shroud 102 is adjustable in relation to the lower shroud 118, and fixed in position by the clamping assembly 116. The shroud 102 may therefore be called the upper shroud. The lower shroud 118 is attachable to a steering gearbox (not shown). During collapse, the shroud 102 may collapse onto the lower shroud 118, such that their combined length shortens.

Figure 2:
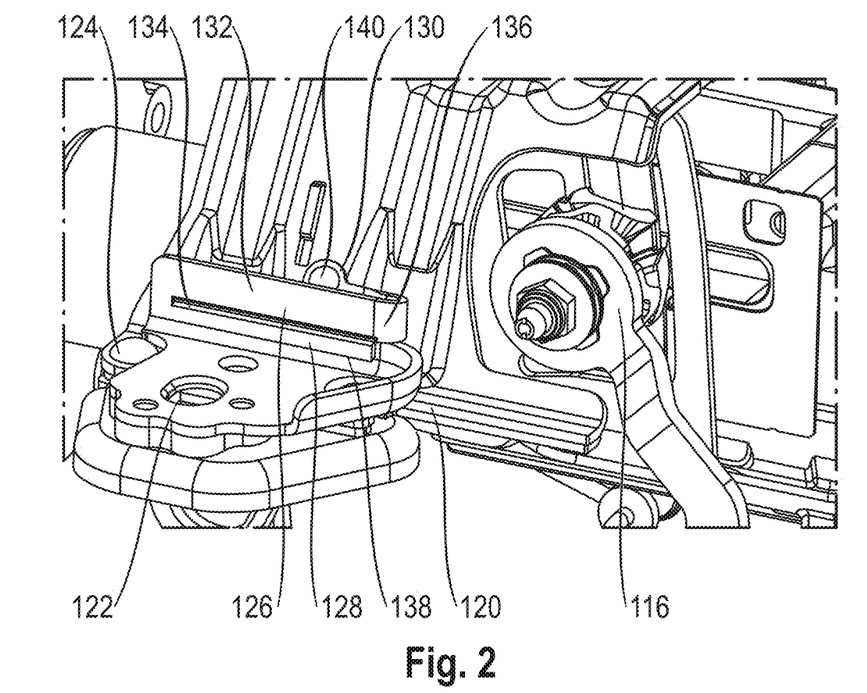
FIG. 2 is a perspective view of the support bracket assembly of FIG. 1.

The capsule assembly 114 is shown enlarged in FIG. 2. The mounting bracket 112 and bolts have been omitted, for clarity. The capsule assemblies 114 engage with wings 120 of the support bracket 108 and are fixed to the mounting bracket 112 by bolts that extend through apertures 122. The engagement with the support bracket 108 is secured with frangible fasteners 124 that normally hold the support bracket 108 secure relative to the capsule assembly 114 and mounting bracket 112. In the event of a sufficient impact, the frangible fasteners 124 break, allowing the support bracket 108 to move relative to the capsule assembly 114 and therefore the mounting bracket 112. In order to control this movement, an energy-absorbing strap 126 is provided on each capsule assembly 114.

Each energy-absorbing strap 126 is formed form a single metal sheet, produced, for example, through stamping. The energy-absorbing strap 126 includes a first connecting portion 128 that is connected to the capsule assembly 114, and a second connecting portion 130 that is connected to the support bracket 108.

A tearable portion 132 is separated from the first connecting portion 128 by a weakening 134, which extends approximately 90 percent of the length of the first connecting portion 128. In the depicted embodiment, the weakening 134 is a groove through the energy-absorbing strap 126. The weakening 134 ensures that deformation of the energy-absorbing strap 126 causes gradual separation of the tearable portion 132 from the first connecting portion 128, as the weakening 134 ruptures. A bent portion 136 interconnects the tearable portion 132 with the second connecting portion 130. As such, the energy-absorbing strap 126 forms a continuous sheet metal path between the first connecting portion 128 and the second connecting portion 130.

The first connecting portion 128 is connected to the capsule assembly 114 by a weld 138 along the length of the connecting portion 128. In other embodiments, other forms of connection may be used, such as screws, bolts, and/or rivets. The second connecting portion 130 is connected to the support bracket 108 by a fastener, which in this case is a bolt 140.

Figure 3:
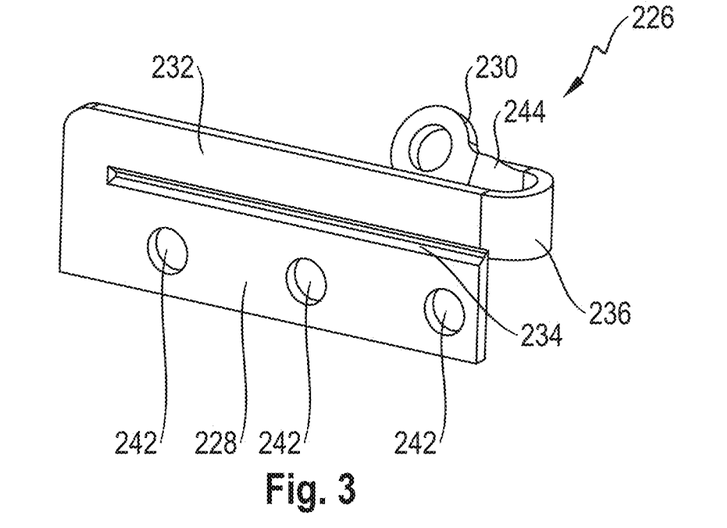
FIG. 3 is a perspective view of a second embodiment of an energy-absorbing strap.

A second embodiment of an energy-absorbing strap 226 is shown in FIG. 3. The second embodiment is identical to the first embodiment in that it also includes a first connecting portion 228, a second connection portion 230, a tearable portion 232, a bent portion 236, and a groove 234. The first connecting portion 228 shown includes a plurality of, in this case three, bolt holes 242. Bolts can therefore be inserted through the bolt holes 242 and the capsule assembly in order to secure the energy-absorbing strap 226 to corresponding holes in the capsule assembly.

Shown more clearly in the embodiment of FIG. 2, but also shown in FIG. 1, the energy-absorbing strap 226 includes a twist 244 on the second connecting portion 230. This twist 244 ensures that the energy-absorbing strap 226 conforms to the support bracket, in order to hold the energy-absorbing strap 226 in place securely during collapse of the steering column assembly and subsequent deformation of the energy-absorbing strap 226.

Figure 4:
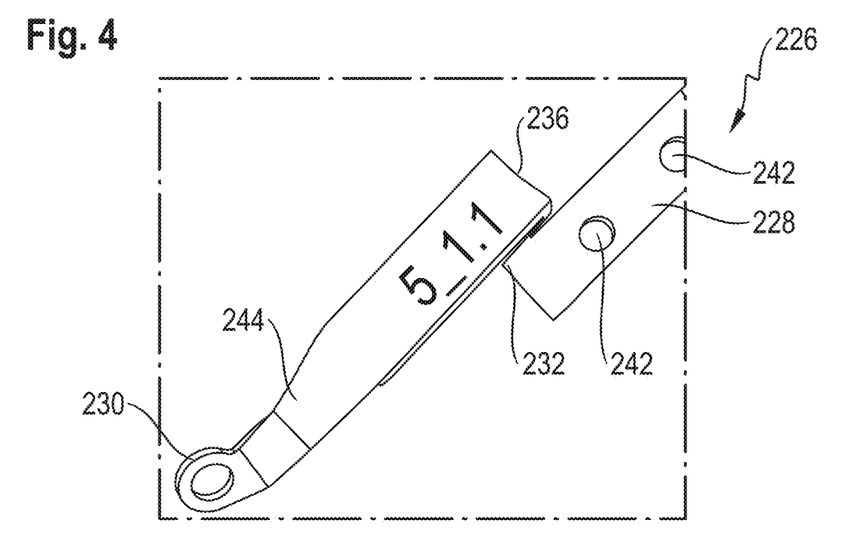
FIG. 4 is a perspective view of the energy-absorbing strap of FIG. 3 after energy absorbance.

As mentioned previously, deformation of the energy-absorbing strap 226 causes the weakening 234 to rupture, allowing the support bracket to move relative to the mounting bracket in a longitudinal direction of the energy-absorbing strap 226. As such, during deformation, the tearable portion 232 gradually deforms and bends, increasing the effective length of the energy-absorbing strap 226. FIG. 4 shows the energy-absorbing strap 226 of FIG. 3 after an impact has caused it to deform.

The energy-absorbance profile of the energy-absorbing strap—i.e. the amount of energy that is absorbed at each stage of the deformation—can therefore be altered by changing the shape of the bent portion, the material properties of the initial single metal sheet, and or the geometry of other parts of the design. As such, the energy-absorbing strap of the depicted embodiments is highly customisable in order to obtain a desired energy-absorbance profile of the designer or manufacturer.

Figure 5:
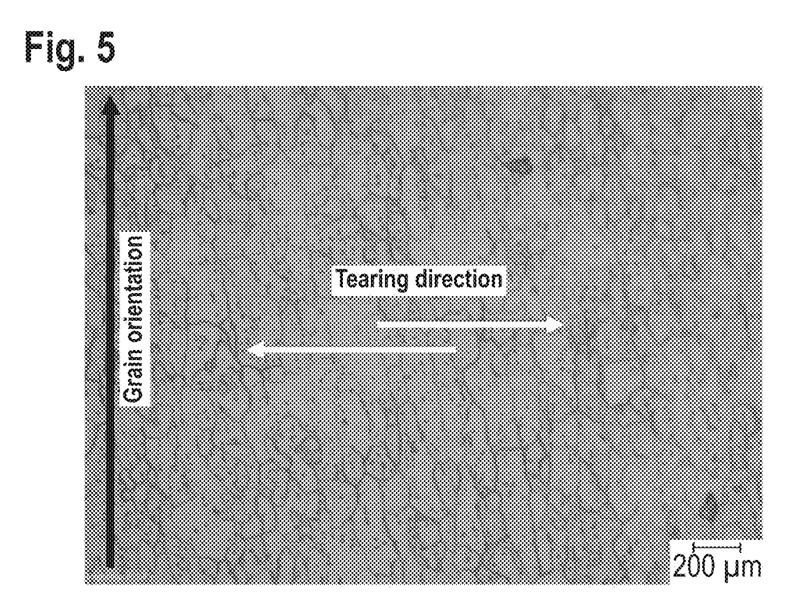
FIG. 5a is a micrograph image of the grain structure of an example energy-absorbing strap with grains aligned to the tearing direction of the energy-absorbing strap.
FIG. 5b is a micrograph image of the grain structure of an example energy-absorbing strap with grains aligned perpendicularly to the tearing direction of the energy-absorbing strap.
Figure 5A:
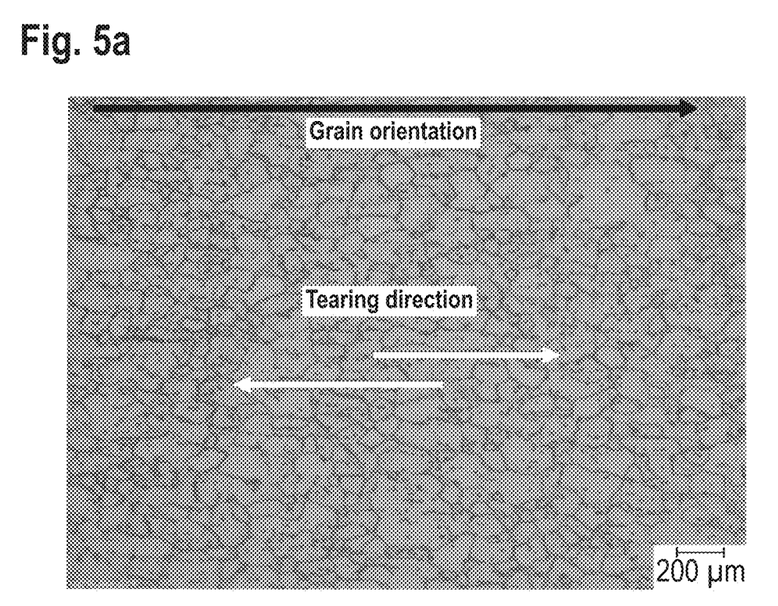

FIGS. 5a and 5b show two micrographs of the grain structure of two embodiments of the energy-absorbing strap. In each Figure, the tearing direction—identical in each—is shown along with the grain orientation direction, which is identified from the grains that are visible on the micrograph. The tearing direction is the direction along the length of the energy-absorbing strap, in the direction of collapse of the steering column assembly, and is generally aligned with the weakening.

In FIG. 5a, it can be seen that the direction of grain orientation is parallel to the tearing direction. Conversely, in FIG. 5b the grain orientation is perpendicular to the tearing direction. In each case, the grain size is substantially the same. The difference this makes to the energy-absorbance profile of each of the energy-absorbing straps can be seen in FIG. 6, as other than the grain structure the energy-absorbing straps of both embodiments are identical and have a shape similar to that of FIG. 3.

Figure 6:
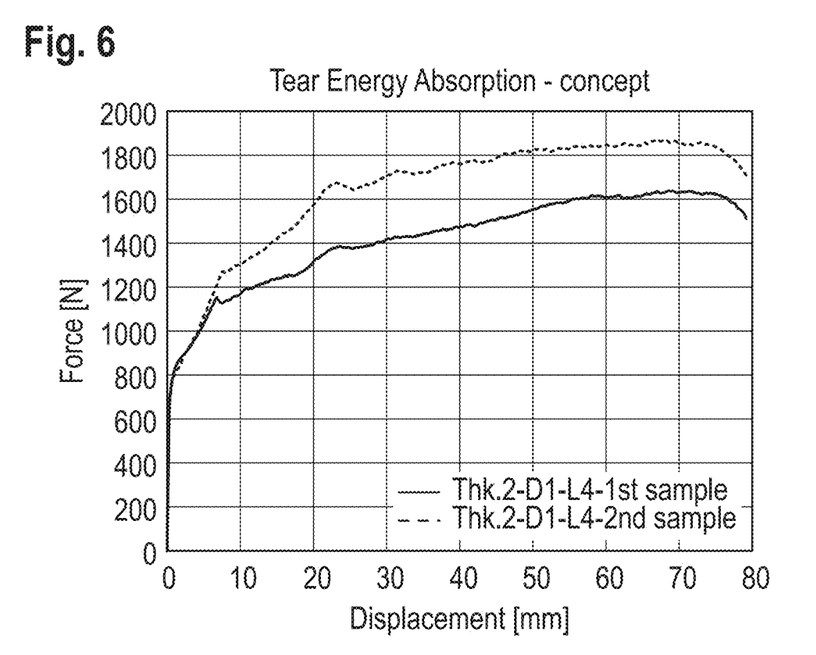
FIG. 6 is a graph showing a comparison of collapse force against distance for energy-absorbing straps having the grain structures of FIGS. 4 and 5.

During the first 6 mm of the collapse displacement, the energy-absorbance of the energy-absorbing straps is essentially identical. This is because this part of the collapse stroke corresponds to the bending of the bent portion, prior to any tearing occurring. However, once tearing begins, along the length of the weakening, the difference that the grain structure makes becomes apparent.

The lower trace on FIG. 6 corresponds to the energy-absorbance profile of the energy-absorbing strap of FIG. 5a and the upper trace on FIG. 6 corresponds to the energy-absorbance profile of the energy-absorbing strap of FIG. 5b. As can be seen, once the tearing of the weakening begins, the force required per millimetre of displacement is significantly lower—approximately 300 N lower to deform the embodiment where the grains are aligned with the tearing direction than the embodiment where grains are perpendicular to the tearing direction. It is therefore clear that, by controlling the grain orientation, the energy-absorbance profile of each energy-absorbing strap can be further tuned.

Of course, whilst the depicted embodiments show only the two extremes of grain orientation, i.e. aligned and perpendicular, it is also possible to have any grain orientation between these two extreme positions. By having grain orientations between these two positions, energy-absorbance profiles between the two extremes shown in FIG. 6 may be obtained.

Another way of tuning the energy-absorbance profile of the energy-absorbing strap is to alter the initial bend radius of the energy-absorbing strap. The initial bend radius is the radius of the bent portion before an impact and so before any force has been applied to the energy-absorbing strap when in a steering column assembly. It is noted that each energy-absorbing strap has a natural bend radius that is influenced by the material properties such as, but not limited to, stiffness, material grain direction/structure, and tearing energy. After a first initial distance of tearing, the bent portion tends to achieve a constant radius that is stabilised on a natural.

Figure 7A:
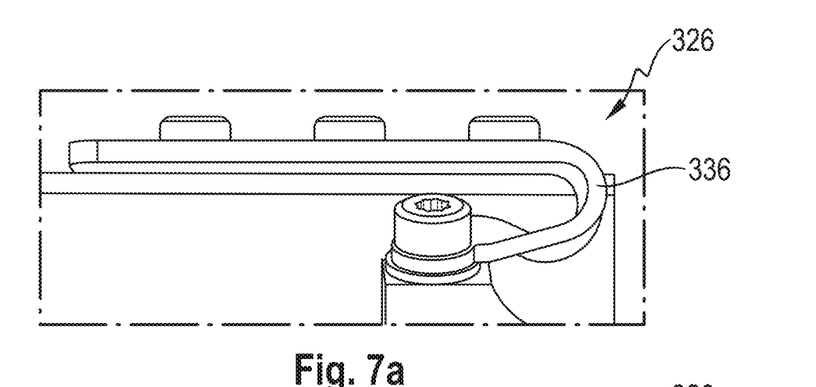
FIG. 7a shows a first variation in radius of a bent portion of an example energy-absorbing strap during deformation.
Figure 7B:
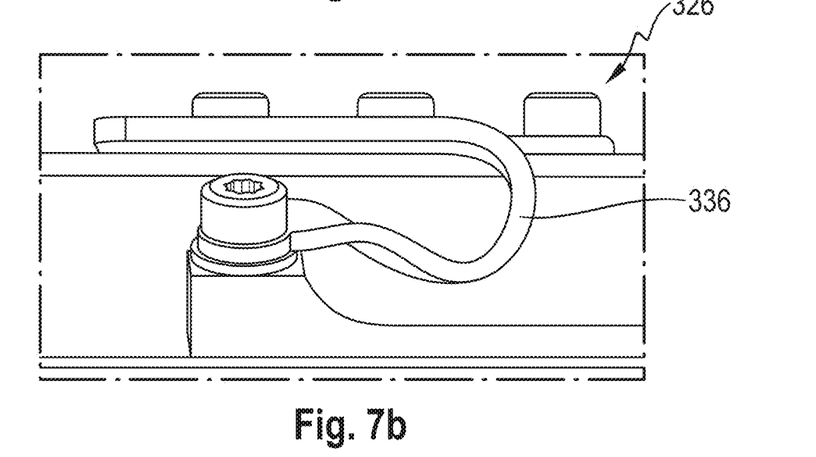
FIG. 7b shows a second variation in radius of a bent portion of an example energy-absorbing strap during deformation.
Figure 7C:
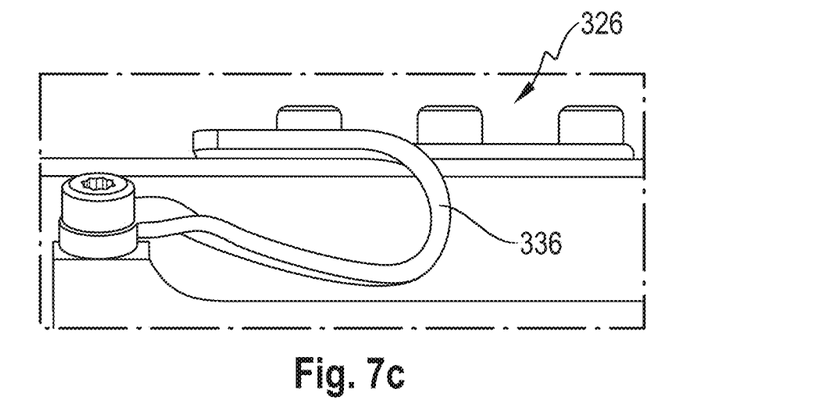
FIG. 7c shows a third variation in radius of a bent portion of an example energy-absorbing strap during deformation.

FIGS. 7a to 7c show the change in the radius of the bent portion 336 of an embodiment energy-absorbing strap 326 during deformation of the strap 326. FIG. 7a shows the initial bend radius of the bent portion 336. In this case, the bend radius is smaller than the natural bend radius governed by the material properties of the energy-absorbing strap 326.

After an initial period of deformation, the energy-absorbing strap 326 reaches the position shown in FIG. 7b. Here, the bent portion 336 is transitioning between the initial bend radius and the natural bend radius, and is in a transitional state. It can be seen that the bend radius has started to grow due to the natural radius being larger than the initial bend radius.

FIG. 7c shows the energy-absorbing strap 326 after further deformation. Here, the bend radius has expanded to the point that it is now at the natural radius of the energy-absorbing strap 326. The radius at any point in the deformation of the energy-absorbing strap 326 has an effect on the force required to further displace the energy-absorbing strap 326.

Figure 8A:
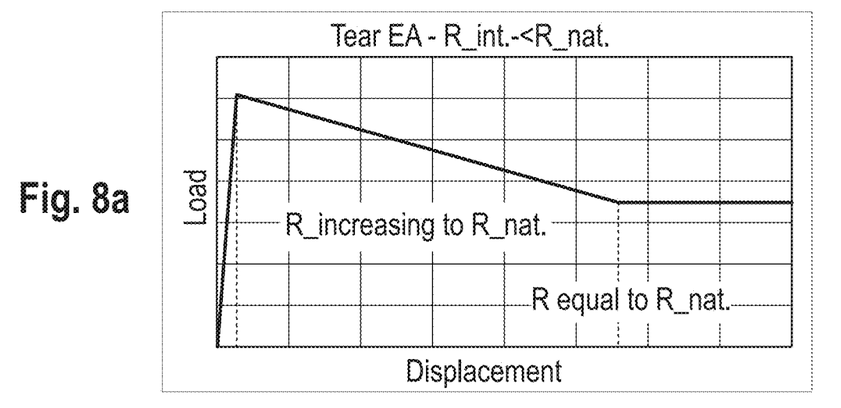
FIG. 8a shows a first variation in load against displacement for three embodiments of an energy-absorbing strap, this embodiment initially having a bent portion with a different bend radius.

FIG. 8a depicts the difference in force against displacement distance for the energy-absorbing strap of FIGS. 7a to 7c. Here, it can be seen that, once past the initial deformation, where the increase in force is high, the force required to displace the energy-absorbing strap per unit length decreases. This decrease is attributable to the enlargement of the radius of the bent portion over the course of the deformation. Once the bent portion has reached the natural radius, the load required to further deform the energy-absorbing strap is constant, as the bent portion keeps the natural radius through the remainder of the crash stroke.

Figure 8B:
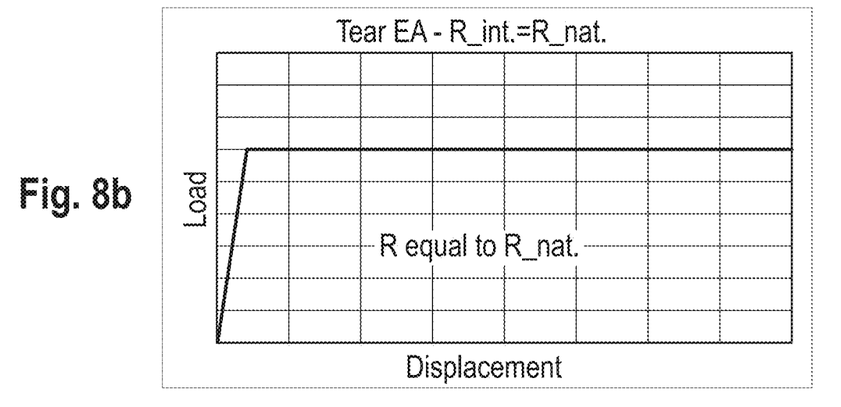
FIG. 8b shows a second variation in load against displacement for three embodiments of an energy-absorbing strap, this embodiment initially having a bent portion with a different bend radius.

In FIG. 8b, an energy-absorbance profile of an embodiment that has an initial bend radius that is equal to the natural radius is shown. Here, as the radius of the bent portion does not change during the crash stroke, the force required to deform the energy-absorbing strap remains constant.

Figure 8C:
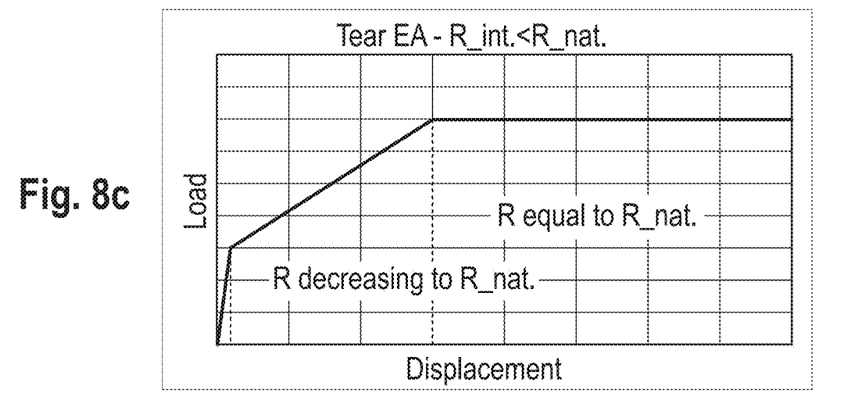
FIG. 8c shows a third variation in load against displacement for three embodiments of an energy-absorbing strap, this embodiment initially having a bent portion with a different bend radius.

In FIG. 8c, an energy-absorbance profile of an embodiment that has an initial bend radius that is lower than the natural radius is shown. In such a case, after the initial deformation, the force required to displace the energy-absorbing strap per unit length increases. This increase is attributable to the reduction in size of the radius of the bent portion over the course of the deformation. Once the bent portion has reached the natural radius, the load required to further deform the energy-absorbing strap is constant, as the bent portion keeps the natural radius through the remainder of the crash stroke.

Deformation of an energy-absorbing strap through tearing is a complicated material phenomenon, with both shear and bending taking place in the same time. However, a good prediction level can be achieved with simple computer-aided engineering (CAE) methods.

Dissipation of kinetic energy is achieved through plastic dissipation and through material damage during shear. Shear force level is influenced by the size of the groove while bending force level is influenced by the whole sample thickness and bending part width. Different combinations of groove depth/total thickness/part width can create different loading scenarios which can be optimally used in desired design of a steering wheel column.

Material correlation tests are required to be completed prior to simulation of any embodiment of an energy-absorbing strap. At a minimum, in order to provide a good simulation, it is necessary to carry out both a tensile test and a shear test.

Easy access to computational methods to optimize the shape of an energy-absorbing strap makes CAE a good and repeatable method for optimizing the performance of the full assembly during prototype development.

As well as the above-mentioned properties, the force required to tear the energy-absorbing strap may be altered by varying the gain structure, grain size, grain thickness, rolling direction, or any other material property. By changing properties such as these, the tear characteristics of the energy-absorbing strap can further be controlled.

What is claimed is:

1. A support bracket assembly for fixing a shroud of a steering column assembly to a vehicle, the support bracket assembly comprising:
    a support bracket configured to be fixable to the shroud; and
    an energy-absorbing strap for interconnecting the support bracket with a fixed part of the vehicle;
    wherein the energy-absorbing strap is formed from a single metal sheet and comprises:
        a first connecting portion configured to connect to one of the support bracket and the fixed part of the vehicle;
        a tearable portion extending along a part of one edge of the energy-absorbing strap, the tearable portion being connected to the first connecting portion by a weakening;
        a second connecting portion configured to connect to the other of the support bracket and the fixed part of the vehicle; and
        a bent portion interconnecting the second connecting portion and the tearable portion, the bent portion having a natural bend radius and an initial bend radius that is different than the natural bend radius, the bent portion deforming from the initial bend radius toward the natural bend radius in response to a force acting on the energy-absorbing strap, the second connecting portion being bent back around in relation to the tearable portion.

2. A method for producing the energy-absorbing strap of claim 1, comprising the steps of:
    producing the single metal sheet, including the first connecting portion, for connecting to one of the support bracket and the fixed part of the vehicle, and the second connecting portion, for connecting to the other of the support bracket and the fixed part of the vehicle;
    producing the weakening in the single metal sheet to separate the first connecting portion from the tearable portion;
    bending a portion of the single metal sheet to produce the bent portion that interconnects the second connecting portion and the tearable portion, the second portion being bent back around in relation to the tearable portion;
    wherein the steps are selected to produce a desired energy-absorbance profile.

3. A method according to claim 2, wherein at least one of the natural bend radius and the initial bend radius is a constant radius.

4. A method according to claim 2, wherein at least one of the natural bend radius and the initial bend radius is a variable radius.

5. A method according to claim 4, wherein the variable radius increases with distance from the tearable portion.

6. A method according to claim 2, wherein the bent portion is U-shaped or substantially U-shaped, or elliptic or rounded elliptic.

7. A method according to claim 2, wherein the bent portion is V-shaped or substantially V-shaped.

8. A method according to claim 2, wherein the step of producing the weakening includes forming a groove between the tearable portion and the first connecting portion.

9. A method according to claim 8, wherein a depth of the groove varies along a length of the groove.

10. A method according to claim 2, wherein the step of producing the weakening includes forming a perforation between the tearable portion and the first connecting portion.

11. A method according to claim 2, further comprising the step of selecting a grain direction of the single metal sheet in order to influence the energy-absorbance profile.

12. A method according to claim 11, wherein the grain direction is selected to be aligned or substantially aligned with a tearing direction of the tearable portion or wherein the grain direction is selected to be perpendicular or substantially perpendicular to a tearing direction of the tearable portion.

13. A method according to claim 2, further comprising a step of twisting the second connecting portion to form a twist.

14. A support bracket assembly according to claim 1, wherein at least one of the natural bend radius and the initial bend radius is a constant radius.

15. A support bracket assembly according to claim 1, wherein at least one of the initial bend radius and the natural bend radius is a variable radius.

16. A support bracket assembly according to claim 15, wherein the variable radius increases with distance from the tearable portion.

17. A support bracket assembly according to claim 15, wherein the bent portion is U-shaped or substantially U-shaped, elliptic or rounded elliptic, or V shaped or substantially V-shaped.

18. A support bracket assembly for fixing a shroud of a steering column assembly to a vehicle, the support bracket assembly comprising:

a support bracket configured to be fixable to the shroud; and an energy-absorbing strap for interconnecting the support bracket with a fixed part of the vehicle;

wherein the energy-absorbing strap is formed from a single metal sheet and comprises:

a first connecting portion configured to connect to one of the support bracket and the fixed part of the vehicle;

a tearable portion extending along a part of one edge of the energy-absorbing strap;

a single weakening, the single weakening connecting the tearable portion to the first connecting portion and including only a single perforation line or groove;

a second connecting portion configured to connect to the other of the support bracket and the fixed part of the vehicle; and a bent portion interconnecting the second connecting portion and the tearable portion, the second connecting portion being bent back around in relation to the tearable portion.

19. A support bracket assembly according to claim 18, wherein the bent portion has a constant radius.

20. A support bracket assembly according to claim 18, wherein the bent portion has a radius that is the same as a natural radius of the bent portion.

21. A support bracket assembly according to claim 18, wherein the bent portion has a radius that is different to a natural radius of the bent portion.

22. A support bracket assembly according to claim 18, wherein the bent portion has a variable radius.

* * * * *